(12) United States Patent
Fraser

(10) Patent No.: US 8,065,871 B1
(45) Date of Patent: Nov. 29, 2011

(54) APPARATUS, SYSTEM, AND METHOD FOR REAL-TIME DIAGNOSIS OF A $NO_x$-ADSORPTION CATALYST

(75) Inventor: Steven Fraser, Indianapolis, IN (US)

(73) Assignee: Cummins IP, Inc, Minneapolis, MN (US)

( * ) Notice: Subject to any disclaimer, the term of this patent is extended or adjusted under 35 U.S.C. 154(b) by 1001 days.

(21) Appl. No.: 11/968,582

(22) Filed: Jan. 2, 2008

Related U.S. Application Data

(60) Provisional application No. 60/883,148, filed on Jan. 2, 2007.

(51) Int. Cl.
*F01N 3/00* (2006.01)

(52) U.S. Cl. ............ 60/295; 60/274; 60/276; 60/299; 60/301

(58) Field of Classification Search ...... 60/27, 284–287, 60/276, 277, 295–301, 274
See application file for complete search history.

(56) References Cited

U.S. PATENT DOCUMENTS

| | | | |
|---|---|---|---|
| 5,237,818 A * | 8/1993 | Ishii et al. .................. 60/274 |
| 5,267,439 A | 12/1993 | Raff et al. |
| 5,303,580 A | 4/1994 | Schneider et al. |
| 5,317,868 A | 6/1994 | Blischke et al. |
| 5,335,538 A | 8/1994 | Blischke et al. |
| 5,359,853 A | 11/1994 | Shimizu |
| 5,488,858 A | 2/1996 | Achleitner |
| 5,627,757 A * | 5/1997 | Comignaghi et al. ........ 701/103 |
| 5,761,901 A | 6/1998 | Staufenberg et al. |
| 5,851,376 A * | 12/1998 | Nishioka et al. ........... 205/784.5 |
| 5,875,628 A * | 3/1999 | Mitsutani ................... 60/276 |
| 6,003,307 A | 12/1999 | Naber et al. |
| 6,116,021 A | 9/2000 | Schumacher et al. |
| 6,216,449 B1 | 4/2001 | Strehlau et al. |
| 6,301,881 B1 | 10/2001 | Kumar ........................ 60/274 |
| 6,497,092 B1 | 12/2002 | Theis |
| 6,499,291 B2 | 12/2002 | Lang et al. |
| 6,581,371 B1 | 6/2003 | Orzel et al. ................. 60/277 |
| 6,601,381 B2 | 8/2003 | Mussmann et al. |
| 6,631,611 B2 | 10/2003 | Shi et al. |
| 6,673,619 B2 | 1/2004 | Sawada |
| 6,684,628 B2 | 2/2004 | Gobel et al. |
| 6,694,243 B2 | 2/2004 | Shi et al. |

(Continued)

FOREIGN PATENT DOCUMENTS

DE 4331153 A1 3/1994

*Primary Examiner* — Thomas Denion
*Assistant Examiner* — Jesse Bogue
(74) *Attorney, Agent, or Firm* — Kunzler Needham Massey & Thorpe

(57) ABSTRACT

An apparatus, system, and method are disclosed for real-time diagnosis of a $NO_x$-adsorption catalyst (NAC). The method includes verifying that a NAC temperature exceeds a threshold, determining that the NAC is in a steady-state operating condition, and surveying a first oxygen sensor upstream of the NAC and a second oxygen sensor downstream of the NAC. The method further includes calculating a lambda difference between the first and second oxygen sensors, and interpreting a NAC regeneration indicator. The method further includes determining a lean-to-rich transition and a rich-to-lean transition area based on the lambda difference and the regeneration indicator. The method concludes with setting a NAC function indicator according to the lean-to-rich transition area and the rich-to-lean transition area.

27 Claims, 13 Drawing Sheets

U.S. PATENT DOCUMENTS

| | | |
|---|---|---|
| 6,803,236 B2 | 10/2004 | Bailey et al. |
| 6,901,742 B1 | 6/2005 | Lang et al. |
| 6,922,985 B2 * | 8/2005 | Wang et al. ..................... 60/277 |
| 6,990,854 B2 | 1/2006 | Van Nieuwstadt et al. .. 73/118.1 |
| 7,003,943 B2 | 2/2006 | Ketterer et al. |
| 7,281,369 B2 * | 10/2007 | Emi et al. ........................ 60/297 |
| 7,343,734 B2 | 3/2008 | Aliakbarzadeh et al. |
| 7,484,407 B2 | 2/2009 | Arlt et al. |
| 7,536,851 B2 * | 5/2009 | Mc Lain ......................... 60/277 |
| 7,628,063 B2 | 12/2009 | Yezerets et al. |
| 2004/0040282 A1 | 3/2004 | Zhu ................................. 60/276 |
| 2004/0163381 A1 * | 8/2004 | Shirakawa et al. ............. 60/285 |
| 2005/0119822 A1 | 6/2005 | Surnilla et al. ................ 701/114 |
| 2005/0223699 A1 | 10/2005 | Ancimer et al. |
| 2007/0234708 A1 | 10/2007 | Jones et al. |
| 2008/0314023 A1 | 12/2008 | Pohmerer et al. |
| 2008/0319634 A1 | 12/2008 | Odendall |

\* cited by examiner

APPARATUS, SYSTEM, AND METHOD FOR REAL-TIME DIAGNOSIS OF A $NO_x$-ADSORPTION CATALYST

BACKGROUND OF THE INVENTION

1. Field of the Invention

This invention relates to engine aftertreatment systems and more particularly relates to apparatus, systems and methods for real-time diagnosis of a $NO_x$-adsorption catalyst.

2. Description of the Related Art

Environmental regulations on internal combustion engines have become steadily more stringent in recent years. The use of aftertreatment systems to reduce engine emissions has become an important part of the emissions package for many engines. One important category of aftertreatment systems is the $NO_x$-adsorption catalyst (NAC). In one typical design, these catalysts adsorb $NO_x$ compounds and oxygen while an engine runs lean, and desorb and reduce the $NO_x$ compounds in a regeneration cycle while the engine runs rich.

The catalytic materials in the NAC age over time and become less effective. Specifically, the NAC will lose capacity to store $NO_x$ compounds and oxygen, thereby requiring more frequent regenerations and increased emissions. There is currently no direct measurement of the NAC $NO_x$ compounds and oxygen storage capacity. A determination that the storage capacity for these compounds has degraded enables a myriad of mitigating responses to a degraded NAC. For example, engine controls can respond with increased regeneration frequency, a service lamp can be engaged, or an emissions control scheme within the engine can be invoked.

Further, regulations require an On-Board Diagnostic (OBD) plan in many applications, and a method to detect degradation of the catalyst element of a NAC meets the requirements of these regulations. The diagnostics to meet OBD regulations should run with an engine as the engine is used (i.e. in real-time) and not require special stops or testing activities to be effective.

From the foregoing discussion, it should be apparent that a need exists for an apparatus, system, and method for real-time diagnosis of a NAC. Beneficially, such an apparatus, system, and method, would enable diagnosing the NAC using commonly available sensors, and not require excessive computer power.

SUMMARY OF THE INVENTION

The present invention has been developed in response to the present state of the art, and in particular, in response to the problems and needs in the art that have not yet been fully solved by currently available sensor-based control systems wherein the reliability of the sensor response is questionable under defined conditions. Accordingly, the present invention has been developed to provide an apparatus, system, and method for real-time diagnosis of a $NO_x$-adsorption catalyst (NAC) that overcomes many or all of the above-discussed shortcomings in the art.

An apparatus is disclosed for real-time diagnosis of a NAC. The apparatus has a number of modules configured to perform the functions to diagnose the NAC. The apparatus may include a NAC operation module, an exhaust conditions module, an engine conditions module, an integration module, and a NAC function label module. The NAC operation module is configured to verify that the NAC temperature exceeds a threshold, and that the NAC is in a steady-state operating condition. The exhaust conditions module is configured to survey oxygen sensors to calculate a lambda ($\lambda$) difference of the NAC inlet relative to the NAC outlet. The engine conditions module is configured to interpret a NAC regeneration indicator that indicates whether a NAC regeneration is active. The integration module is configured to determine a lean-to-rich transition area and a rich-to-lean transition area based on the $\lambda$ difference and the regeneration indicator. The NAC function label module is configured to set a NAC function indicator according to the lean-to-rich transition area and a rich-to-lean transition area.

In one embodiment, the NAC operation module is further configured to increment a steady-state counter when a successful regeneration of the NAC occurs, decrement the steady-state counter when a failed regeneration of the NAC occurs, and to determine that the NAC is in a steady-state operating condition when the steady-state counter exceeds a NAC steady state threshold. In one embodiment, the integration module is further configured to determine a $\lambda$ difference response based on the $\lambda$ difference, to determine the lean-to-rich transition area by integrating a difference between the $\lambda$ difference response and a baseline lean-to-rich response, and to determine the rich-to-lean transition area by integrating a difference between the $\lambda$ difference response and a baseline rich-to-lean response.

A method is disclosed for real-time diagnosis of a $NO_x$-adsorbing catalyst. The method includes verifying that a NAC temperature exceeds a threshold, determining that the NAC is in a steady-state operating condition, and surveying a first oxygen sensor upstream of the NAC and a second oxygen sensor downstream of the NAC. The method further includes calculating a $\lambda$ difference between the first and second oxygen sensors, and interpreting a NAC regeneration indicator. The method further includes determining a lean-to-rich transition and a rich-to-lean transition area based on the $\lambda$ difference and the regeneration indicator. The method may conclude with setting a NAC function indicator according to the lean-to-rich transition area and the rich-to-lean transition area.

In one embodiment, the method further includes verifying that the first oxygen sensor and the second oxygen sensor do not have a fault indication. Surveying the first oxygen sensor may comprise reading each sensor response, and filtering each sensor response. The method may further include determining that the NAC is in a steady-state operating condition by incrementing a steady-state counter when a successful regeneration of the NAC occurs, decrementing the steady-state counter when a failed regeneration of the NAC occurs, and determining the NAC to be in a steady-state condition when the steady-state counter exceeds a NAC steady state threshold. In one embodiment, the method includes limiting the steady-state counter to values between a minimum and maximum value.

The method may further include determining a $\lambda$ difference response based on the $\lambda$ difference, and determining the lean-to-rich and rich-to-lean transition areas may further include integrating a difference between the $\lambda$ difference response and a baseline lean-to-rich and baseline rich-to-lean response, respectively. The method may further include stopping the integration when the $\lambda$ difference response indicates that a major lean-to-rich or rich-to-lean pulse is completed. The major lean-to-rich or rich-to-lean pulse may be completed when the $\lambda$ difference response indicates the pulse is complete, and/or when a second integration area based on the $\lambda$ difference response and the respective baseline response is large enough to indicate a major pulse completion.

Setting the NAC function indicator according to the lean-to-rich transition area and the rich-to-lean transition area may further include calculating a NAC function vector from the lean-to-rich transition area and the rich-to-lean transition area, and determining the NAC function indicator from the angle and magnitude of the NAC function vector. In one embodiment, setting the NAC function indicator includes entering the lean-to-rich transition area and the rich-to-lean transition area into a two-dimensional lookup table, and retrieving the NAC function indicator from the lookup table.

A system is disclosed for real-time diagnosis of a NAC. The system includes an internal combustion engine, which may be a diesel engine. The system further includes a NAC disposed to treat the exhaust stream, a first oxygen sensor upstream of the NAC, and a second oxygen sensor downstream of the NAC. The system further includes a controller comprising a NAC operation module, an exhaust conditions module, an engine conditions module, an integration module, and a NAC function label module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables real-time diagnosis of a NAC. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
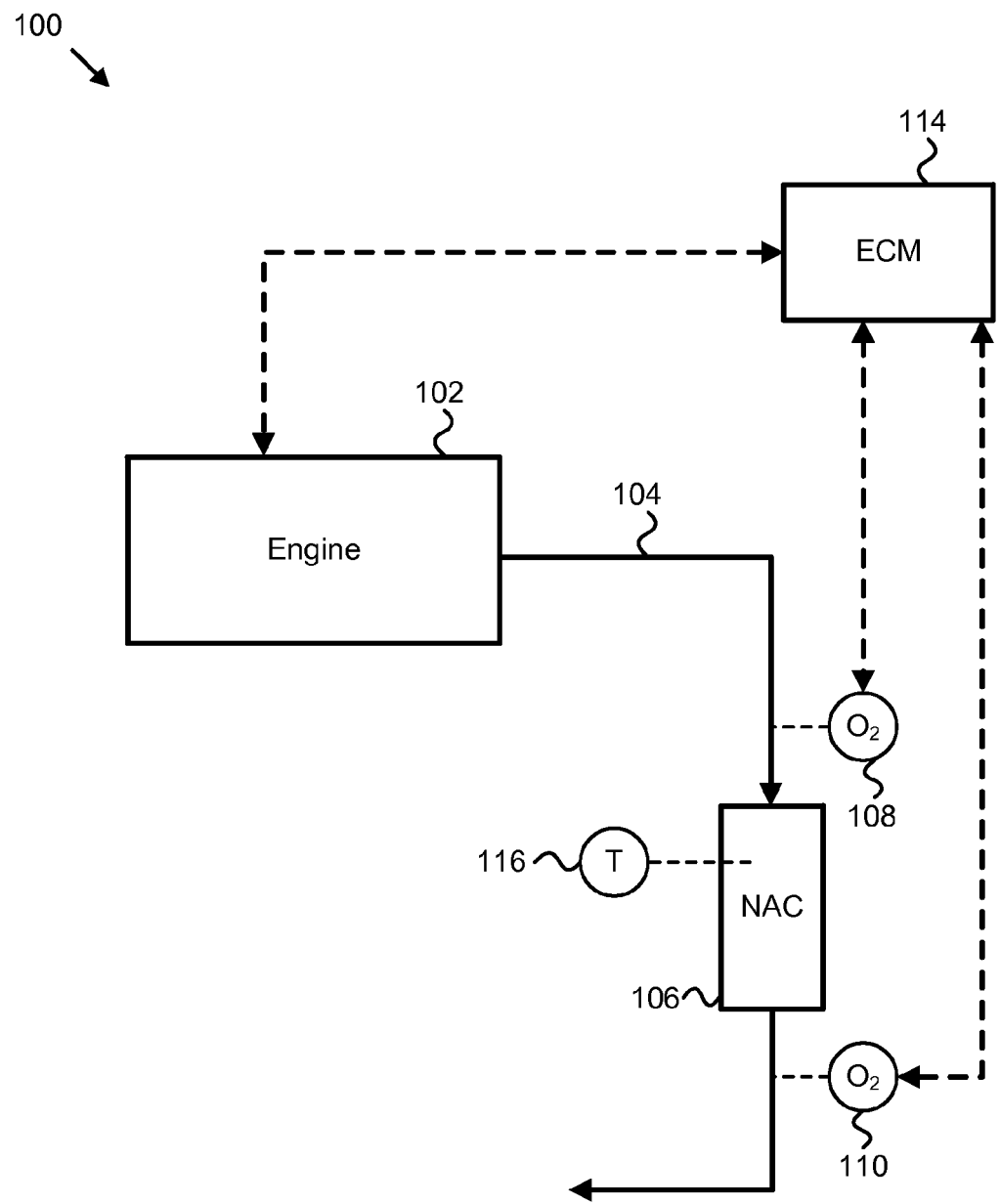
FIG. 1 is a schematic block diagram illustrating one embodiment of system for real-time diagnosis of a $NO_x$-adsorption catalyst (NAC) in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of system 100 for real-time diagnosis of a $NO_x$-adsorption catalyst (NAC) in accordance with the present invention. The system 100 comprises an engine 102 that produces an exhaust stream 104. The engine 102 may be a diesel engine 104. The system 100 further comprises a $NO_x$-adsorption catalyst (NAC) 106 disposed to treat the exhaust stream 104. The NAC comprises a catalyst that may be configured to adsorb $NO_x$ from the exhaust stream 104. the engine 102 may be configured to periodically regenerate the NAC 106 by transitioning to rich engine operation to cause adsorbed $NO_x$ to desorb and be reduced before exhausting to the atmosphere.

The system 100 further comprises a first oxygen sensor 108 upstream of the NAC 106, and a second oxygen sensor 110 downstream of the NAC 106. The oxygen sensors 108, 110 are of the "wide range" rather than "switching" type. The sensors 108, 110 may be configured to return a voltage or a data parameter indicating the oxygen level in the exhaust stream 104. In one embodiment, the sensors 108, 110 return a λ value where λ represents the ratio of oxygen in the exhaust stream 104 to the stoichiometric ratio required to combust system 100 hydrocarbons. For example, at a λ of 1.3, the engine 102 is running "lean," at a λ of 0.7, the engine is running "rich," and at a λ of 1.0 the engine is running at the stoichiometric ratio.

The system 100 may further comprise a temperature determination means 112 for the NAC 106. The temperature determination means 112 may comprise one or more temperature sensors (not shown) and/or one or more temperature estimation algorithms based on engine 102 operating parameters and the like. The temperature determination means 112 for the system 100 does not need comprise a high degree of accuracy. For example, a temperature measurement and/or estimate on the order of +/−50 degrees C. is sufficient. The temperature determination means 112 estimates whether the NAC 106 is up to a temperature where the NAC 106 should be expected to operate normally. Accordingly, substitutes for a specific temperature determination—for example a check that the engine 102 has operated for a specified period of time—also suffice for a temperature determination means 112.

The system 100 may further comprise a controller 114 which may be an engine control module (ECM) 114. The controller 114 may communicate with various components of the system 100, including the engine 102, the oxygen sensors 108, 110, and/or various other sensors and actuators according to the hardware of the specific embodiment of the system 100.

Figure 2:
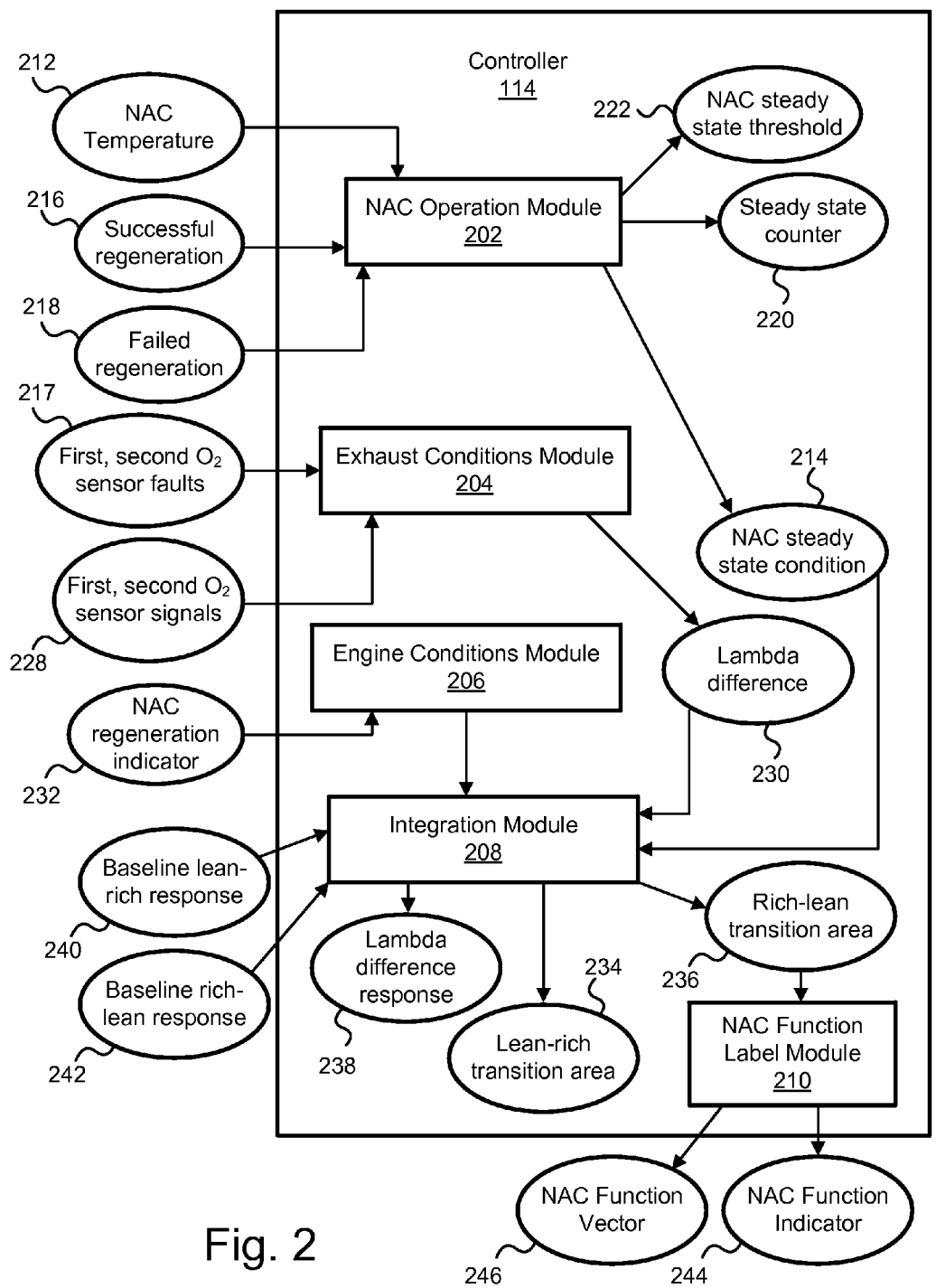
FIG. 2 is a schematic block diagram illustrating one embodiment of a controller in accordance with the present invention.

FIG. 2 is a schematic block diagram illustrating one embodiment of a controller 114 in accordance with the present invention. The controller 114 comprises various modules configured to diagnose the NAC 106 in real-time. In one embodiment, the controller 114 comprises a NAC Operation Module 202, an exhaust conditions module 204, an engine conditions module 206, an integration module 208, and a NAC function label module 210.

The NAC operation module 202 is configured to verify that the NAC temperature 212 exceeds a threshold. The NAC 106 should be near the designed operating temperature—typically around 200 degrees C. minimum—before a diagnostic is performed according to the present invention. Accordingly, the NAC temperature 212 does not require a high degree of accuracy, and many temperature determination means 112 known in the art are sufficient for providing a NAC temperature 212.

The NAC operation module 202 is further configured to determine whether the NAC 106 is in a steady-state operating condition 214. In one embodiment, the NAC operation module 202 receives indicators of successful regeneration events 216 and/or failed regeneration events 218 from the engine 102 and/or the controller 114. The composition of material (e.g. various nitrogen, oxygen, and sulfur compounds) desorbed from the NAC 106 at each regeneration event changes when the NAC 106 misses a regeneration event. Therefore, as the system 100 experiences failed regeneration events 218, the diagnostic procedure becomes unreliable and the diagnostic should not be attempted. A failed regeneration event 218 varies according to the system 100, but in one embodiment a failed regeneration event 218 is an event where the engine 102 attempts to facilitate a regeneration of the NAC 106 for a specified period, and the regeneration is not completed within the specified period. As the system 100 experiences successful regeneration events 216, the composition of the material desorbing from the NAC 106 approaches a steady state condition 214 and the diagnostic is likely to be successful.

In one embodiment, the NAC operation module 202 executes a steady state counter 220 to determine the NAC steady state condition 214. The counter 220 counts up (increments) with successful regenerations 216, and counts down (decrements) with failed regenerations 218. The NAC 106 is determined to be in a steady state condition 214 when the counter 220 exceeds the NAC steady state threshold 222. The ratio between the count up and the count down depends upon the particular system 100, and varies with the NAC 106 catalyst composition, the engine 102 exhaust composition, and the selected regeneration strategy for the system 100.

A straightforward data set tracking the number of successful regeneration events 216 for a particular system 100 to reach a steady state condition 214—where the composition of desorbed materials is consistent upon the initiation of a regeneration event—is a mechanical step for one of skill in the art. The NAC steady state threshold 222 may be set to the value (N−1)*INC, where N is the number of successful regenerations 216 required for the NAC 106 to reach a steady state condition 214, and wherein INC is the increment value for each successful regeneration 216.

To determine the count up to count down ratio, a second data set, wherein one or more unsuccessful regenerations 218 are initiated just before the NAC 106 reaches the steady state condition 214, may be taken and is also a mechanical step for one of skill in the art. For example, a first data set may comprise a series of sixteen successful regeneration events 216 before the NAC released gas composition achieves a steady state condition 214. In the example, a second data set may comprise a series of twelve successful regeneration events 216, then a failed regeneration event 218 may be performed, and then ten successful regeneration events 216 may be required until the NAC 106 achieves a steady state condition 214. In the example, the increment may be set to one, the decrement may be set to six, and the steady state threshold 222 may be set to fifteen.

An increment value of one, a decrement value of one, and a steady state threshold 222 of twenty-three has been found to work well in many embodiments of the system 100. In one embodiment, the steady state counter 220 may be limited to a value between a minimum value and a maximum value, inclusive, to avoid counter windup. For example, no matter how many successful regenerations 216 occur consecutively on the NAC 106, a small series of unsuccessful regenerations may cause the composition from the NAC 106 to vary at the initiation of a regeneration event. It is a mechanical step for one of skill in the art to determine the counter 220 limits for a particular embodiment of the system 100 by taking sample data from a NAC 106 that has experienced a very long period of successful regeneration events 216 or unsuccessful regeneration events 218. For example, the counter 220 may be limited to zero at the low end, and to 7*INC+TH at the high end, where INC is the increment value for each successful regeneration 216 and TH is the NAC steady state threshold 222. The example embodiment allows the NAC steady state threshold 222 to be designed for a worst case situation where the NAC 106 may experience long periods without a successful regeneration event 216.

The exhaust conditions module 204 is configured to survey the first and second oxygen sensors 108, 110. Surveying the sensors 108, 110 may comprise reading a signal from each the sensors 108, 110, reading a λ value from each of the sensors 108, 110, reading parameters from a datalink with information derived from the sensors 108, 110, and the like. In one embodiment, the sensors 108, 110 each provide a signal 224 comprising a value of λ, and a fault indication 226 indicating whether the sensor 108, 110 is deemed reliable.

In one embodiment, surveying the sensors 108, 110 comprises reading each oxygen sensor response, and filtering each response. The filtering of oxygen sensors is well known in the art and is dependent upon the features of interest in the oxygen sensor signal 228 for the system 100. A typical system 100 will have a high pass filter to highlight desired signal change features, and a low pass filter to dampen signal noise. The tuning of these filters is a mechanical step for one of skill in the art. Where oxygen sensor signals 228 are presented in the descriptions herein, it is assumed that the signals 228 are already filtered.

The exhaust conditions module 204 is further configured to calculate a λ difference 230 between the first and second oxygen sensors 108, 110. The present invention is not sensitive to the sign of the λ difference, however the convention assumed herein is that the λ difference 230 is the $\lambda_u - \lambda_d$, where $\lambda_u$ is the λ from the upstream oxygen sensor 108, and the $\lambda_d$ is the λ from the downstream oxygen sensor 110. Therefore, as used herein, a negative λ difference 230 indicates that the downstream oxygen sensor 110 is reading a higher λ value than the upstream oxygen sensor, or the exhaust stream 104 is richer upstream of the NAC 106 than downstream of the NAC 106. It is within the skill of one in the art to reverse this convention, and such reversal is contemplated within the scope of the present invention.

The engine conditions module 206 is configured to interpret a NAC regeneration indicator 232. The NAC regeneration indicator 232 is an indication of whether the engine 102 is supporting a regeneration event for the NAC 106. The engine 102, the controller 114, and/or some other component in the system 100 may provide the NAC regeneration indicator 232. The NAC regeneration indicator 232 may comprise an inferred value from parameters available within the system 100—for example the engine conditions module 206 may detect very late post injection in the engine 102 and infer the NAC regeneration indicator 232 based on whether very late post injection is occurring. The engine conditions module 206 provides the NAC regeneration indicator 232 to the integration module 208.

The integration module 208 is configured to determine a lean-to-rich transition area 234 and a rich-to-lean transition area 236 based on the λ difference 230 and the regeneration indicator 232. The integration module 208 may determine a λ difference response 238 based on the λ difference 230, for example by multiplying the λ difference response 238 by the time between execution cycles of the controller 114.

The integration module 208 may be further configured to determine the lean-to-rich transition area 234 by integrating a difference between the λ difference response 238 and a baseline lean-to-rich response 240. The integration module 208 may be configured to integrate for the lean-to-rich transition area 234 when the regeneration indicator 232 indicates that a NAC regeneration event is underway. The integration module 208 may be configured to stop integrating for the lean-to-rich transition 234 when the λ difference response 238 indicates that a major lean-to-rich pulse is completed.

In one example, the integration module 208 may treat the major lean-to-rich pulse as complete when the λ difference response 238 indicates a lean NAC outlet relative to the baseline lean-to-rich response 240. Those of skill in the art will note that this is equivalent to determining whether the λ difference value 230 is lower than the baseline lean-to-rich response 240 at a particular point in time. The integration module 208 may be further configured to treat the major lean-to-rich pulse as complete if the second integrated area 604 (refer to FIG. 6) exceeds a threshold. For example, if the baseline lean-to-rich response 240 indicates a λ difference 230 of 0.05, and the current λ difference 230 is 0.07, the integration module 208 is configured to integrate the area above the 0.05 baseline 240. If the second integrated area 604 exceeds a threshold, the integration module 208 may be configured to stop integrating for the lean-to-rich transition 234.

The integration module 208 may be further configured to determine the rich-to-lean transition area 236 by integrating a difference between the λ difference response 238 and a baseline rich-to-lean response 242. The integration module 208 may be configured to integrate for the rich-to-lean transition area 234 when the regeneration indicator 232 indicates that a NAC regeneration event is no longer underway. The integration module 208 may be configured to stop integrating for the rich-to-lean transition 234 when the λ difference response 238 indicates that a major rich-to-lean pulse is completed.

In one example, the integration module 208 may treat the major rich-to-lean pulse as complete when the λ difference response 238 indicates a rich NAC outlet relative to the baseline rich-to-lean response 242. Those of skill in the art will note that this is equivalent to determining whether the λ difference value 230 is higher than the baseline rich-to-lean response 242 at a particular point in time. The integration module 208 may be further configured to treat the major rich-to-lean pulse as complete if the second integrated area 604 exceeds a threshold. For example, if the baseline rich-tolean response 242 indicates a λ difference 230 of 0.00, and a current λ difference 230 is −0.20, the integration module 208 is configured to integrate the area below the baseline 242. If the second integrated area 604 exceeds a threshold, the integration module 208 may be configured to stop integrating for the rich-to-lean transition area 236.

Note for the examples that the second integration area for the rich-to-lean transition may be a negative value, but for the purposes of the stopping the rich-to-lean integration, only the absolute value of the area is used. If the second integration area is added to the rich-to-lean transition area 236—for example if the second area does not grow large enough to end the major pulse—the actual sign of the second area is used in the addition.

In one embodiment, the second integration area is attributed to the lean-to-rich transition area 236 if the second integration area does not reach the threshold to end the major pulse. In another embodiment, the lean-to-rich transition area 236 is integrated while the second integration area is integrated, and if the second integration area reaches the threshold to end the major pulse, the second integration area is backed out of the lean-to-rich transition area 236 when the major pulse is ended. The rich-to-lean transition area 234 may interact similarly with the second integration area during the rich-to-lean transition.

The NAC function label module 210 is configured to set a NAC function indicator 244 according to the lean-to-rich transition area 234 and the rich-to-lean transition area 236. The NAC function label module 210 may set the NAC function indicator 244 by retrieving the NAC function indicator 244 from a lookup table. For example, the lookup table may comprise a two-dimensional lookup table with lean-to-rich transition area 234 values on one axis, with rich-to-lean transition area 236 values on the other axis, with the values of the table set to NAC function indicator 244 values.

Figure 3:
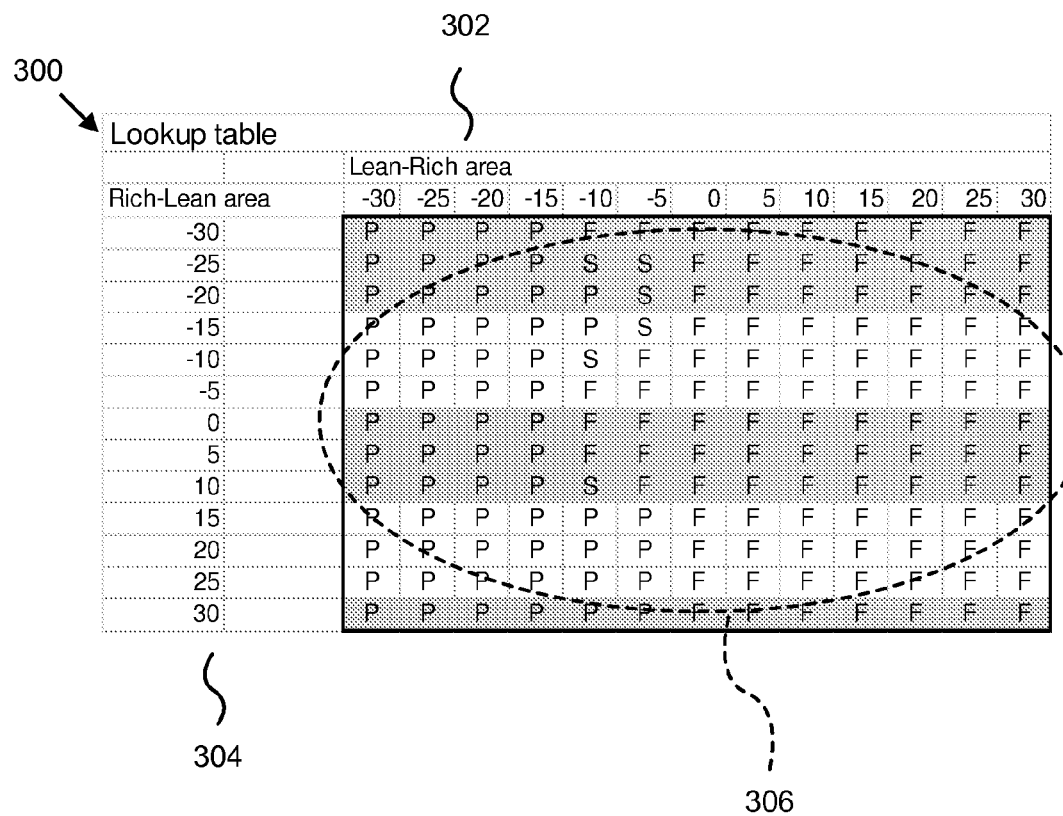
FIG. 3 is an illustration of a lookup table in accordance with the present invention.

Referring to FIG. 3, one example of a lookup table 300 comprises lean-to-rich transitional area 302 values on one axis, and rich-to-lean transitional area 304 values on a second axis. The values 306 of the table 300 in the example comprise an indication of "P," "S," or "F." The values 306 in the example represent (P)ass, (S)uspect, and (F)ail. In one embodiment, the values 306 of the table 300 may comprise quantitative values of NAC adsorption capacity remaining, quantitative values of a NAC aging index, categorical values similar to those shown in the example of FIG. 3, and the like.

It is within the skill of one in the art to implement a lookup table 300, for example including data handling such as rounding or interpolating to values 306 within the table 300. The units for the axis values 302, 304 for the table 300 will vary with the application. For example, the rich-to-lean transition area may be in units of λ-seconds, as the areas 234, 236 may be developed by integrating λ difference response 238 values, each λ difference response 238 value comprising a λ difference 230 value multiplied by a time unit. The values 306 for the lookup table 300 can be determined with straightforward data sampling for a selected embodiment. For example, to determine the area 302, 304 coordinates for an aged NAC, an aged NAC 106 is brought to a steady state condition 214, regenerated, and the rich-to-lean area 304 and lean-to-rich area 302 of the NAC 106 is recorded. The resulting coordinates are then set to return a NAC function indicator 244 consistent with the aged NAC 106 used for the data.

The table 300 shown in FIG. 3 is a 13×13 table 300, but a different sized table 300 may be used in many circumstances. The axis values 302, 304 may vary with the units selected, the rich-to-lean areas 304 and lean-to-rich areas 302 of interest for the given application, and the like. For example, in the embodiment of FIG. 3, all of the lean-to-rich areas 302 from zero to thirty could be lumped into a single lean rich area 302 coordinate as all of these points are deemed (F)ailed. A table 300 as small as 2×2 provides some utility for diagnosing NACs 106 according to the principles of the invention.

Referring back to FIG. 2, the NAC function label module 210 may set the NAC function indicator 244 by calculating a NAC function vector 246 from the lean-to-rich transition area 234 and the lean-to-rich transition area 236. In one embodiment, the λ value of the NAC function vector 246 may comprise the lean-to-rich transition area 234, and the Y value of the NAC function vector 246 may comprise the rich-to-lean transition area 236.

Figure 4:
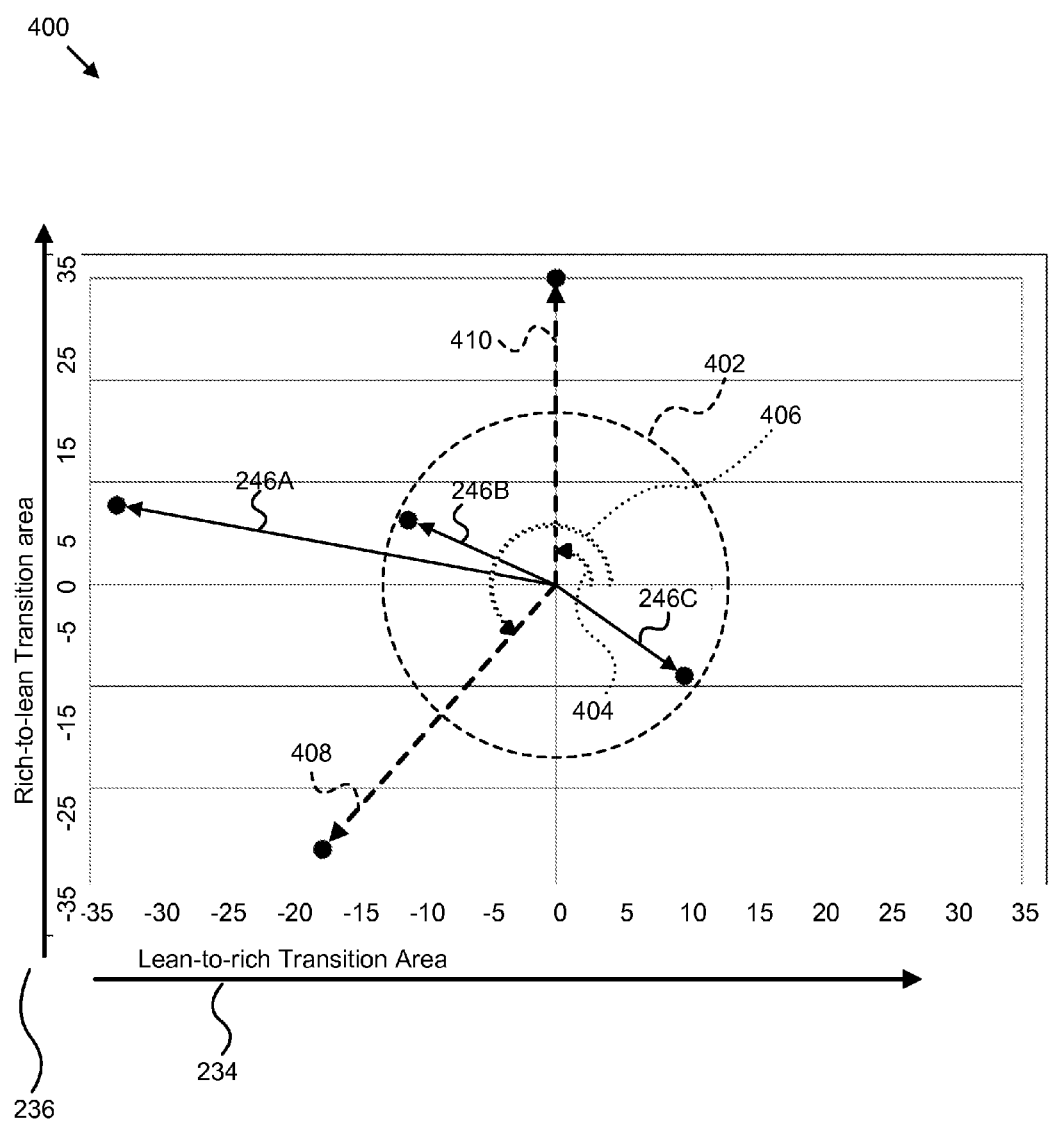
FIG. 4 is an illustration of a NAC function vector in accordance with the present invention.

Referring to FIG. 4, a graph 400 is illustrated wherein various NAC function vectors 246A, 246B, 246C are plotted. The graph 400 comprises a lean-to-rich transition area 234 on one axis, and a rich-to-lean transition area 236 on the other axis. The graph 400 may be a tool used in determining appropriate settings for a magnitude threshold 402, a minimum angle 404, and a maximum angle 406 for determining the NAC function indicator 244 from a NAC function vector 246A, 246B, 246C. The graph 400 may further comprise a standard NAC function vector 408.

The magnitude threshold 402 may comprise a minimum vector 246 magnitude, below which a given NAC function vector 246A, 246B, 246C will return (F)ailed. The magnitude threshold 402 may comprise a percentage of the standard NAC function vector 408. In the example of the graph 400, the magnitude threshold 402 comprises half of the magnitude of the standard NAC function vector 408. It is within the skill of one in the art to set up more magnitudes 402 wherein the NAC function indicator 244 may return marginal or suspect values, or to set up a relationship between the NAC function vector 408 magnitude and a quantitative description of the NAC 106 adsorption capacity using the NAC function indicator 244.

The graph 400 may further comprise a minimum angle 404 and a maximum angle 406. The minimum angle 404 and the maximum angle 406 represent the lower and upper limits of vector 246 angles wherein the NAC function indicator 244 will return a (P)assed value. The minimum angle 404 and the maximum angle 406 may be determined from sample data utilizing NAC 106 components deemed to be aged or failed. In the embodiment of the graph 400, the minimum angle 404 is about 90 degrees (measuring counter clockwise from the positive X axis), and the maximum angle 406 is about 240 degrees. The illustrated angles are consistent with several systems 100 observed in practice. It is within the skill of one in the art to set up more angles 404, 406 wherein the NAC function indicator 244 may return marginal or suspect values, or to set up a relationship between the NAC function vector 408 angle and a quantitative description of the NAC 106 adsorption capacity using the NAC function indicator 244. For example, one of skill in the art may determine the NAC function vectors 246 associated with NAC 106 components which are known to retain 20%, 40%, 60%, 80%, and 100% of the originally designed adsorption capacity.

In the example shown in the graph, the NAC function vector 246C may return a NAC function indicator 244 of (F)ailed because the magnitude of the vector is smaller than the magnitude threshold 402, and because the angle of the vector 246C is not between the minimum angle 404 and the maximum angle 406. The NAC function vector 246B may return a NAC function indicator 244 of (F)ailed, or perhaps (S)uspect, because although the angle of the vector 246B is between the minimum angle 404 and the maximum angle 406, the magnitude of the vector 246B is smaller than the magnitude threshold 402. The vector 246A may return a NAC function indicator 244 of (P)assed because the angle of the vector 246A is between the minimum angle 404 and the maximum angle 406, the magnitude of the vector 246A is smaller than the magnitude threshold 402.

Figure 5:
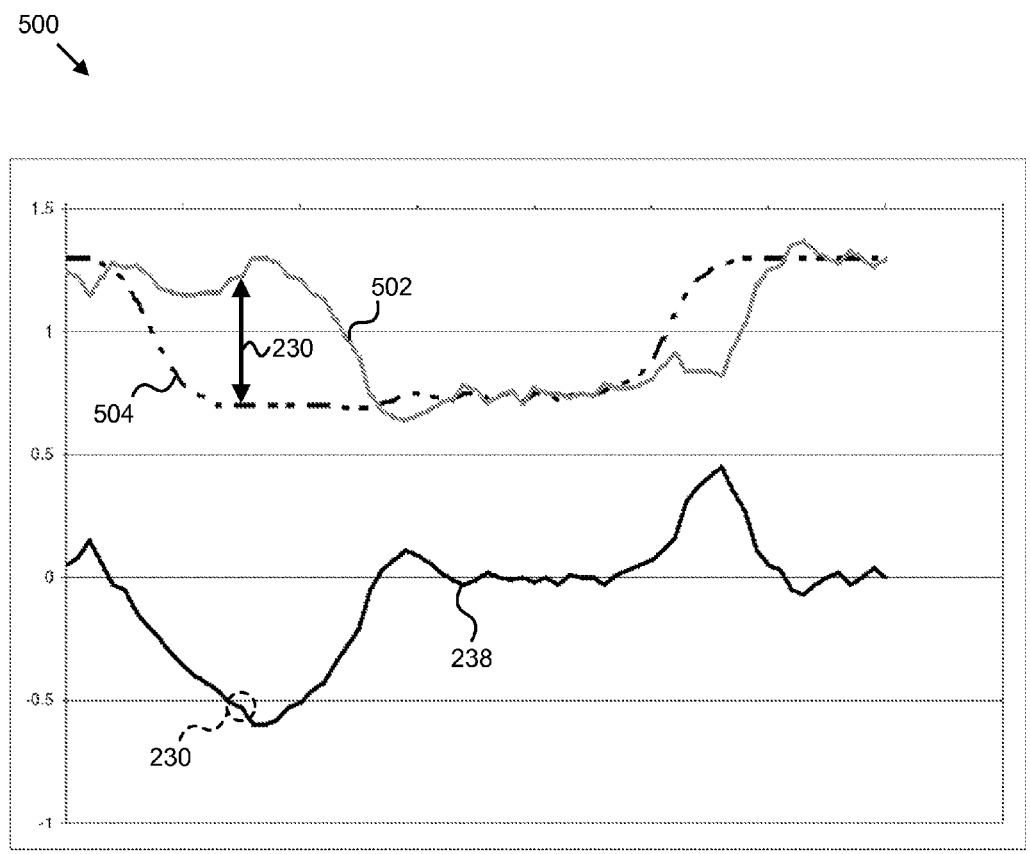
FIG. 5 is an illustration of a lambda ($\lambda$) difference and a $\lambda$ difference response in accordance with the present invention.

FIG. 5 is an illustration 500 of a λ difference 230 and a λ difference response 238 in accordance with the present invention. The λ difference 230 is calculated from a first oxygen sensor signal 502 and a second oxygen sensor signal 504. In the illustration 500, the oxygen sensor signals 502, 504 are plotted against time or an equivalent (e.g. engine 102 runtime, execution cycle number, etc.).

The λ difference response 238 comprises a time-related integration of the λ difference 230. For example, the controller 114 may operate an execution cycle each 200 milliseconds, and the controller 114 may determine a λ difference 230 for each execution cycle. At one execution cycle, the λ difference 230 may be −0.55, and the λ difference response 238 for that execution cycle may be −0.11 λ-seconds. The integration of λ difference response 238 values over a period of time therefore approximates the area of the λ difference response 238 curve relative to a reference curve.

Figure 6:
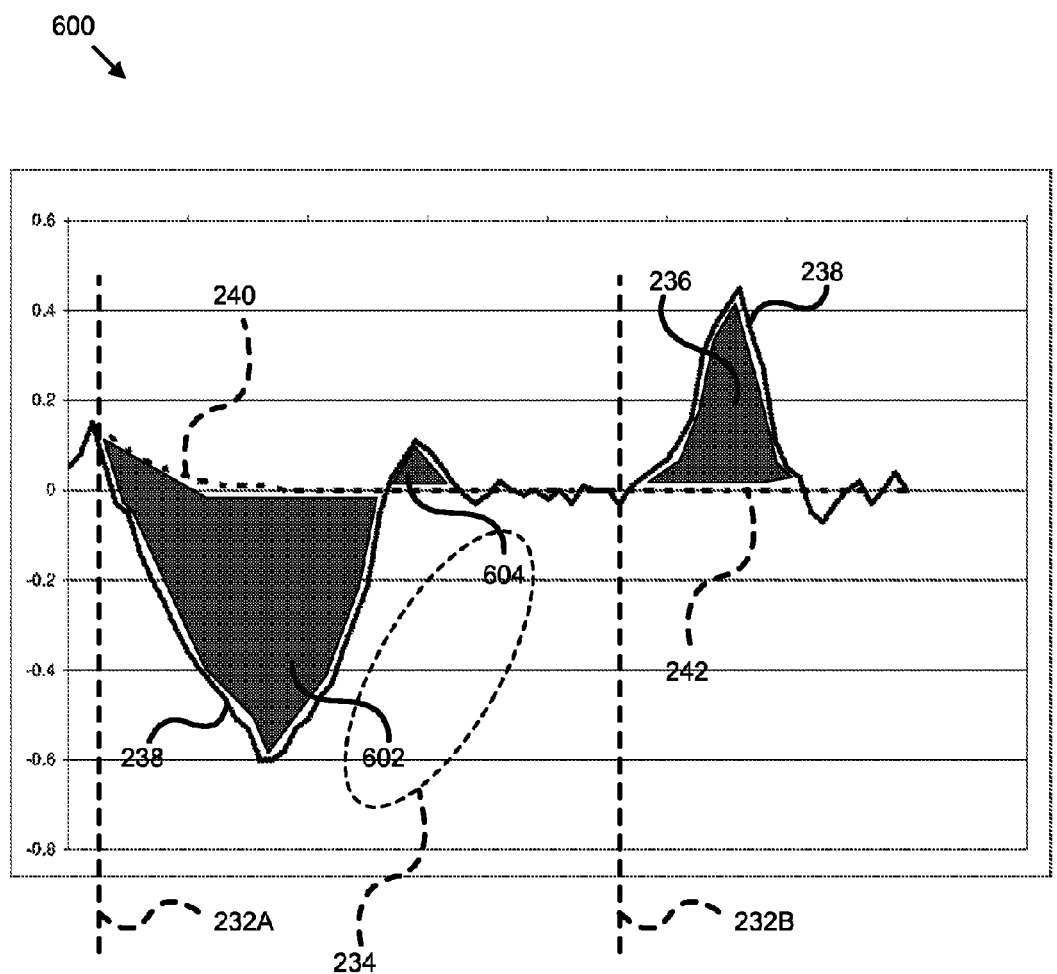
FIG. 6 is an illustration of a lean-to-rich transition area and a lean-to-rich transition area in accordance with the present invention.

FIG. 6 is an illustration 600 of a lean-to-rich transition area 234 and a lean-to-rich transition area 236 in accordance with the present invention. The lean-to-rich transition area 234 may be determined by integrating a difference between the λ difference response 238 and a baseline lean-to-rich response 240. In one embodiment, determining the lean-to-rich transition area 234 is based on the regeneration indicator 232A by resetting the area 234 to zero when the engine 102 begins a regeneration event of the NAC 106, and the controller begins integrating the difference between the λ difference response 238 and the baseline lean-to-rich response 240. The baseline lean-to-rich response 240 is utilized to smooth the area 234 determination.

In one embodiment, the baseline lean-to-rich response 240 comprises an exponential decay—from the λ difference 230 value at the time the regeneration indicator 232A notes a regeneration event, to a λ value of zero. The time constant associated with the exponential decay may be configured such that the decay to a λ value of zero is essentially accomplished within a standard time of the regeneration event—for example the area between the regeneration indicators 232, or between about three seconds and a couple of minutes in many applications. A known rule of thumb is that an exponential decay is essentially complete within five time constants. Therefore, where a regeneration of ten seconds is expected a time constant for the exponential decay of the baseline lean-to-rich response 240 may comprise two seconds.

The baseline lean-to-rich response 240 may also comprise a linear decay to zero, a step change to zero at the beginning of the regeneration event, and the like. If a quick change to zero is implemented in the baseline lean-to-rich response 240 for a given embodiment, a practitioner must account for the likely positive initial value of the lean-to-rich transition area 234 and ensure that the integration is not stopped prematurely—for example by enforcing a few seconds of integration before testing to see if the main pulse is complete, by beginning the integration when the λ difference response 238 indicates a rich NAC outlet relative to the baseline lean-to-rich response 240, and/or by enforcing a zero-crossing of the λ difference response 238 before testing to see if the main pulse is complete.

The lean-to-rich transition area 234 may comprise a first integration area 602 and a second integration area 604. The second integration area 604 is started when the λ difference response 238 switches sign. A sign change as illustrated FIG. 6 indicates a lean NAC 106 outlet relative to the baseline lean-to-rich response 240.

In one embodiment, the integration is stopped, and the lean-to-rich transition area 234 is stored, when the major lean-to-rich pulse is completed. The major lean-to-rich pulse may be considered complete when the λ difference response 238 indicates a lean NAC outlet relative to the baseline lean-to-rich response 240.

In an alternate embodiment, when the λ difference response 238 indicates a lean NAC outlet relative to the baseline lean-to-rich response 240 the controller 114 may track a second integration area 604. In the alternate embodiment, if the second integration area 604 exceeds a threshold value, the major pulse is considered complete and the lean-to-rich transition area 234 is considered only as the first integration area 602. If the λ difference response 238 indicates a rich NAC outlet relative to the baseline lean-to-rich response 240 before the second integration area 604 reaches the threshold value, the second integration area 604 is added to the first integration area 602 to generate the lean-to-rich transition area 234 and the integration is continued. The threshold value for the second integration area 604 can be set to an absolute value (e.g. 3 λ-seconds) as observed from plots of standard regeneration events for a system 100, or the threshold value for the second integration area 604 can be a relative value (e.g. 5% of the first integration area 602).

The rich-to-lean transition area 236 may comprise an integration with analogous features to the lean-to-rich transition area 234 when the regeneration indicator 232B indicates that the regeneration event is completed. The rich-to-lean transition area 236 is calculated from the λ difference response 238 relative to a baseline rich-to-lean response 242. The rich-to-lean transition area 236 may comprise a second integration area, a determination of the end of the major rich-to-lean pulse, and other features similar to the lean-to-rich transition area 234.

The exact areas of the lean-to-rich transition area 234 and the rich-to-lean transition area 236 that are consistent with a degraded or properly operating NAC 106 must be determined for a particular embodiment of the invention as described under the discussion referencing FIGS. 3 and 4. The illustration 600 of FIG. 6 is example data similar to a properly operating NAC 106 for one embodiment of the invention. The relative areas of the lean-to-rich transition area 234 and the rich-to-lean transition area 236 in the illustration 600 are consistent with the NAC function vector 246A (refer to FIG. 4).

Figure 7:
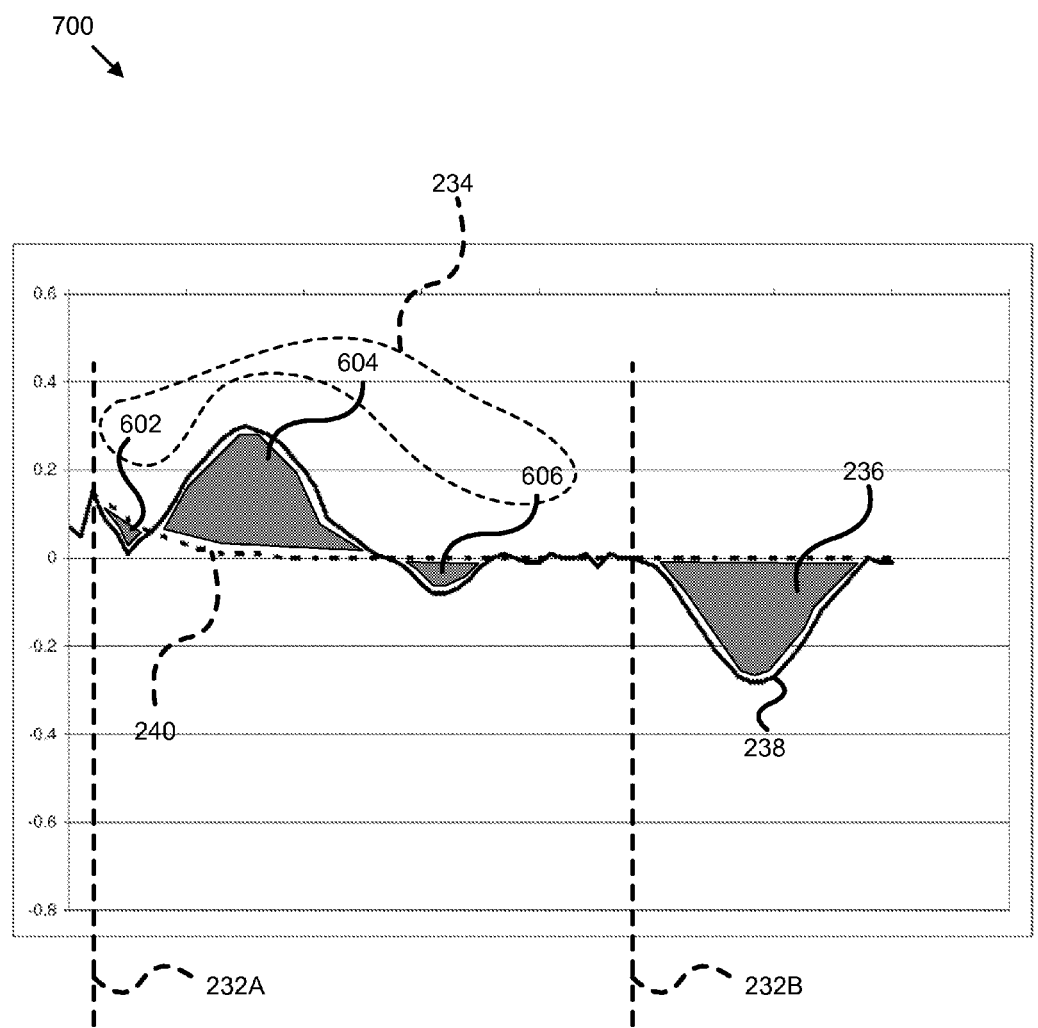
FIG. 7 is an illustration of a lean-to-rich transition area and a lean-to-rich transition area in accordance with the present invention.

FIG. 7 is an illustration 700 of a lean-to-rich transition area 234 and a lean-to-rich transition area 236 in accordance with the present invention. In addition to the descriptions referencing FIG. 6, a noteworthy feature of the illustration 700 is that the primary λ difference response 238 for the lean-to-rich transition after the beginning of the regeneration 232A is the area 604 above the baseline lean-to-rich response 240. The primary λ difference response 238 for the rich-to-lean transition after the end of the regeneration 232B is the rich-to-lean transition area 236 below the baseline rich-to-lean response 242.

The exact areas of the lean-to-rich transition area 234 and the rich-to-lean transition area 236 that are consistent with a degraded or properly operating NAC 106 must be determined for a particular embodiment of the invention as described under the discussion referencing FIGS. 3 and 4. The illustration 700 of FIG. 7 is example data similar to a failed NAC 106 for one embodiment of the invention. The relative areas of the lean-to-rich transition area 234 and the rich-to-lean transition area 236 in the illustration 700 are consistent with the NAC function vector 246C (refer to FIG. 4).

Figure 8:
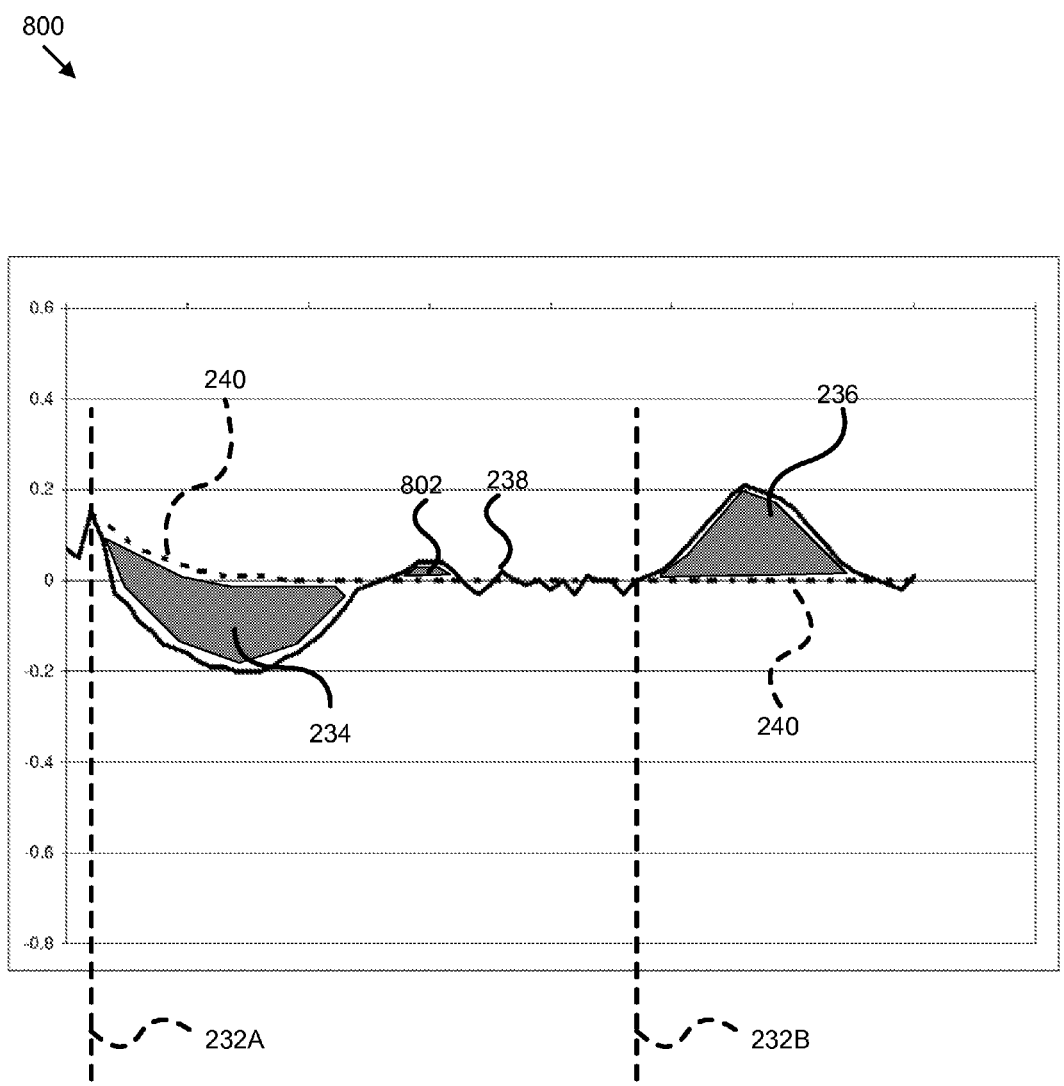
FIG. 8 is an illustration of a lean-to-rich transition area and a lean-to-rich transition area in accordance with the present invention.

FIG. 8 is an illustration 800 of a lean-to-rich transition area 234 and a lean-to-rich transition area 236 in accordance with the present invention. In addition to the descriptions referencing FIG. 6, a noteworthy feature of the illustration 800 is that the lean-to-rich and rich-to-lean transition areas 234, 236 are smaller, assuming a similar time scale to the illustration 600. Also, in the embodiment of FIG. 8, a small area 802 is ignored and not incorporated into the rich-to-lean transition area 234. The illustration 800 of FIG. 8 is consistent with an embodiment that does not check for the end of the major pulse of the rich-to-lean transition for a few seconds, and that stops the integration of the rich-to-lean transition area integration when the λ difference response 238 encounters a zero-crossing after the check for the end of the major pulse begins.

The exact areas of the lean-to-rich transition area 234 and the rich-to-lean transition area 236 that are consistent with a degraded or properly operating NAC 106 must be determined for a particular embodiment of the invention as described under the discussion referencing FIGS. 3 and 4. The illustration 800 of FIG. 8 is example data similar to a marginally failed NAC 106 for one embodiment of the invention. The relative areas of the lean-to-rich transition area 234 and the rich-to-lean transition area 236 in the illustration 800 are consistent with the NAC function vector 246B (refer to FIG. 4).

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
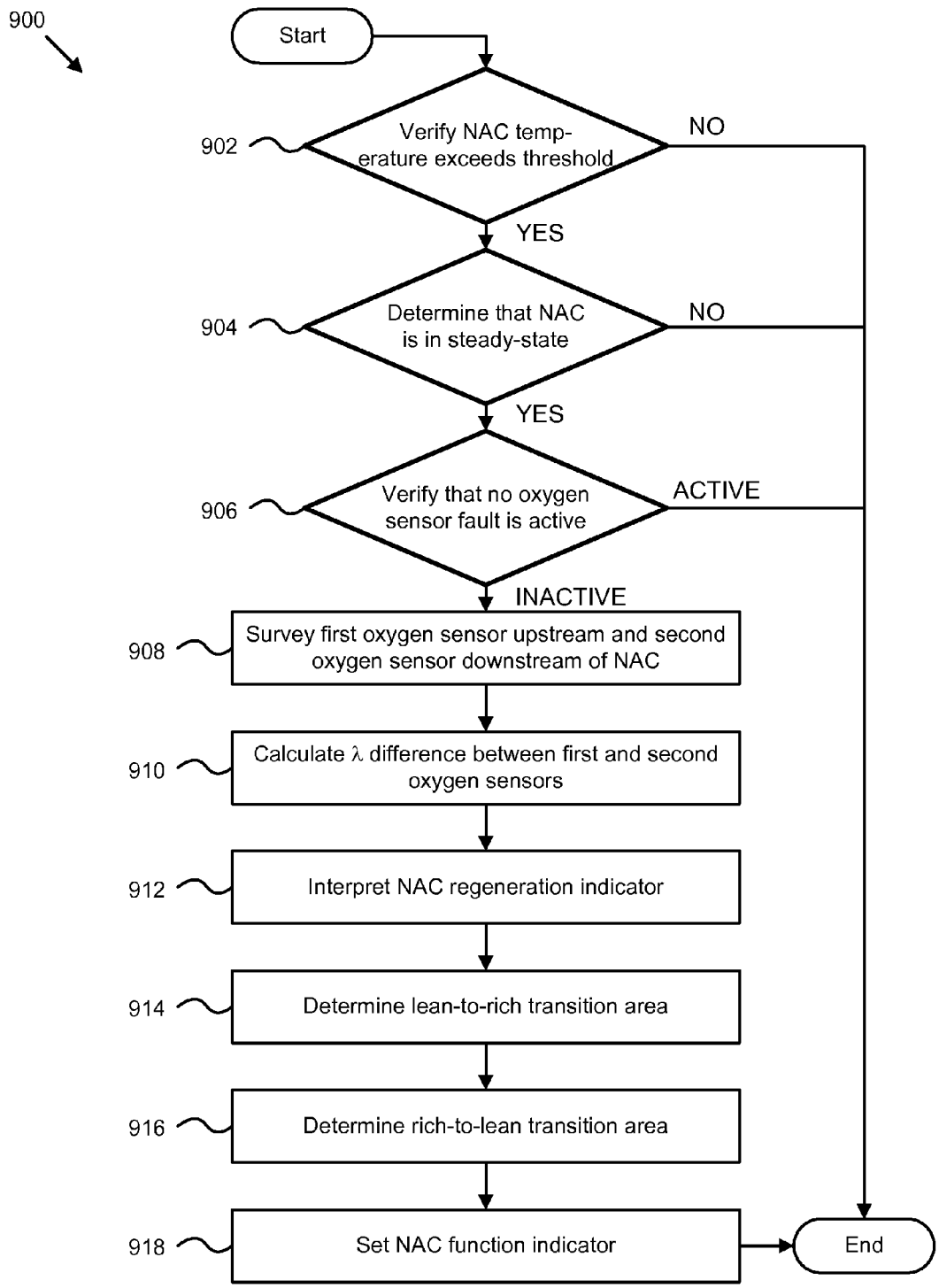
FIG. 9 is a schematic flow chart diagram illustrating one embodiment of a method for real-time diagnosis of a NAC in accordance with the present invention.

FIG. 9 is a schematic flow chart diagram illustrating one embodiment of a method 900 for real-time diagnosis of a NAC 106 in accordance with the present invention. The method 900 may begin with a NAC operation module 202 verifying 902 that a NAC temperature exceeds a threshold, and determining 904 that the NAC is in a steady-state operating condition. The exhaust conditions module 204 may then verify 906 that no oxygen sensor fault 217 is active, i.e. that no sensor has a fault indication. The exhaust conditions module 204 surveys 908 the first oxygen sensor 108 and the second oxygen sensor 110 to determine the sensor signals 228. Surveying 908 the first and second oxygen sensor signals 228 may comprise reading and filtering a first oxygen sensor 108 response, and reading and filtering a second oxygen sensor 110 response.

The engine conditions module 206 interprets 912 a NAC regeneration indicator 232. The integration module 208 then determines 914 a lean-to-rich transition area based on the λ difference 230 and the regeneration indicator 232, and determines 916 a rich-to-lean transition area based on the λ difference 230 and the regeneration indicator 232. The NAC function label module 210 then sets 918 a NAC function indicator according to the lean-to-rich transition area 234 and the rich-to-lean transition area 236. The NAC function label module 210 may set 918 the NAC function indicator by calculating a NAC function vector 246 from the lean-to-rich transition area 234 and the rich-to-lean transition area 236, plotting the NAC function vector 246 on an X-Y graph wherein the X axis indicates the rich-to-lean transition area 234 and the Y axis indicates the lean-to-rich transition area, and setting 918 the NAC function indicator based on the angle and magnitude of the NAC function vector 246. It is a mechanical step for one of skill in the art to swap the areas 234, 236 used for the X and Y axes to the opposite axes set; such an embodiment is an equivalent to the described axes set, and is contemplated within the scope of the present invention.

Figure 10:
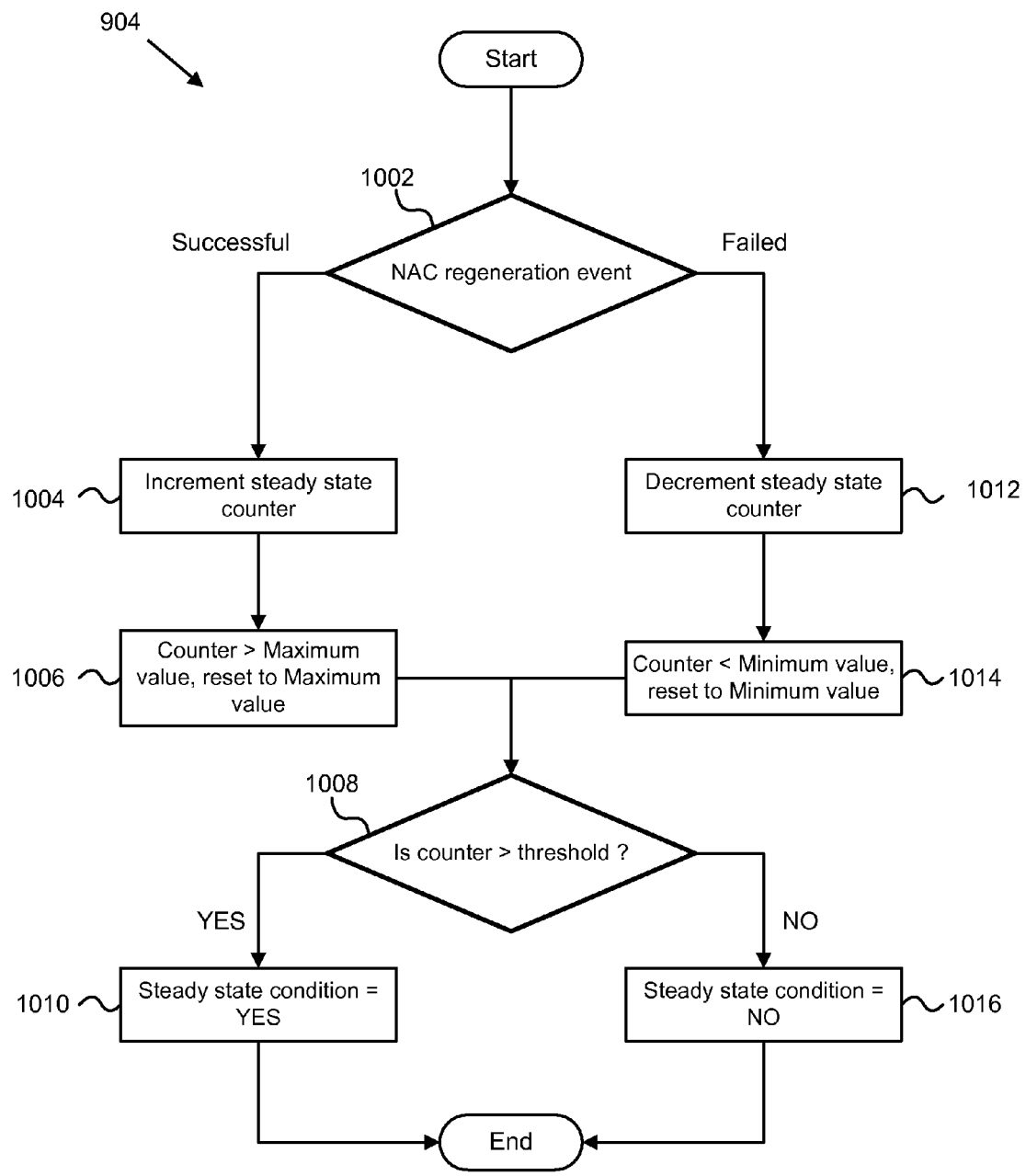
FIG. 10 is a schematic flow chart diagram illustrating one embodiment of determining that a NAC is in a steady-state operating condition in accordance with the present invention.

FIG. 10 is a schematic flow chart diagram illustrating one embodiment of determining 904 that a NAC is in a steady-state operating condition in accordance with the present invention. The NAC operation module 202 may receive 1002 a NAC regeneration event. If the NAC regeneration event is a successful regeneration 216, the NAC operation module 202 may increment 1004 a steady state counter 220, and limit 1006 the steady state counter to a maximum value. If the NAC regeneration event is a failed event 218, the NAC operation module 202 may decrement 1012 the steady state counter 220, and limit 1014 the steady state counter to a minimum value.

The NAC operation module 202 may check 1008 whether the steady state counter exceeds a NAC steady state threshold 222, and determine 1010 the NAC to be in a steady state condition when the steady state counter exceeds a NAC steady state threshold 222. The NAC operation module 202 may determine 1016 the NAC to not be in a steady state condition when the steady state counter does not exceed the NAC steady state threshold 222.

Figure 11:
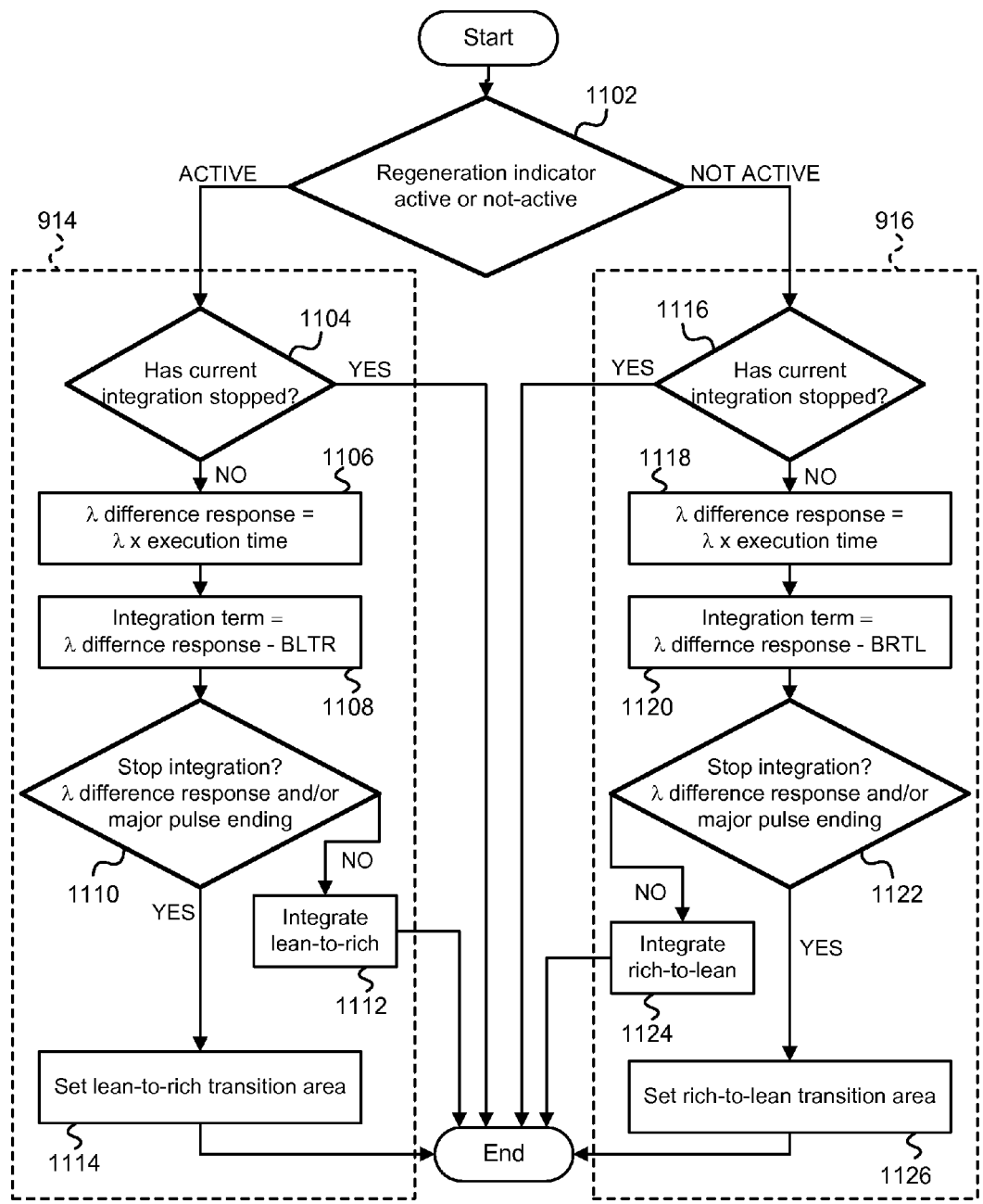
FIG. 11 is a schematic flow chart diagram illustrating one embodiment of determining a lean-to-rich transition area, and determining a rich-to-lean transition area, in accordance with the present invention.

FIG. 11 is a schematic flow chart diagram illustrating one embodiment of determining 914 a lean-to-rich transition area, and determining 916 a rich-to-lean transition area, in accordance with the present invention. The integration module 208 may check 1102 whether the regeneration indicator 232 indicates that a regeneration is ACTIVE or INACTIVE. If the regeneration is ACTIVE, the integration module determines 914 the lean-to-rich transition area 234, and if the regeneration is INACTIVE, the integration module determines 916 the rich-to-lean transition area 236.

The integration module 208 may determine 914 the lean-to-rich transition area 234 by determining 1104 whether the current integration has stopped. If the current integration has stopped, the determination 914 may end, and the integration module 208 will continue terminating the determination 914 at each execution cycle of the controller 114 until the regeneration is INACTIVE and the determination 916 of the rich-to-lean transition area 236 commences. If the current integration has not stopped, the integration module 108 may determine 1106 a λ difference response 238 based on the λ difference 230, and determine 1108 an integration term based on the difference between the λ difference response 238 and a baseline lean-to-rich response 240.

The integration module 208 may check 1110 whether to stop the integration, for example if the λ difference response 238 indicates that the major lean-to-rich pulse has ended, or if the λ difference response 238 has indicated a lean NAC outlet relative to the baseline lean-to-rich response 240, such that a second integration area 604 exceeds a threshold area. If the integration is stopped (1110 with a YES determination) the integration module 108 may set 1114 the lean-to-rich transition area 234 to the current integration value or to a corrected integration value (e.g. if a second integration area 604 should be added or subtracted to the current integration value). If the integration is not stopped (1110 with a NO determination) the integration module 108 may integrate 1112 the lean-to-rich transition area 234 by incrementing the current integration value with the integration term. In one embodiment, the integration module 108 may not check 1110 whether to stop the integration on some execution cycles of the controller 114 (see the description referencing FIG. 6 for times when a check if the major pulse has ended may be suspended).

The integration module 208 may determine 916 the rich-to-lean transition area 236 by determining 1116 whether the current integration has stopped. If the current integration has stopped, the determination 916 may end, and the integration module 208 will continue terminating the determination 916 at each execution cycle of the controller 114 until the regeneration is ACTIVE and the determination 914 of the rich-to-lean transition area 234 commences. If the current integration has not stopped, the integration module 108 may determine 1118 a λ difference response 238 based on the λ difference 230, and determine 1120 an integration term based on the difference between the λ difference response 238 and a baseline rich-to-lean response 242.

The integration module 208 may check 1122 whether to stop the integration, for example if the λ difference response 238 indicates that the major rich-to-lean pulse has ended, or if the λ difference response 238 has indicated a rich NAC outlet relative to the baseline rich-to-lean response 242, such that a second integration area 604 exceeds a threshold area. If the integration is stopped (1116 with a YES determination) the integration module 108 may set 1126 the rich-to-lean transition area 236 to the current integration value or to a corrected integration value (e.g. if a second integration area 604 should be added or subtracted to the current integration value). If the integration is not stopped (1122 with a NO determination) the integration module 108 may integrate 1124 the rich-to-lean transition area 236 by incrementing the current integration value with the integration term. In one embodiment, the integration module 108 may not check 1122 whether to stop the integration on some execution cycles of the controller 114 (see the description referencing FIG. 6 for times when a check if the major pulse has ended may be suspended).

Figure 12:
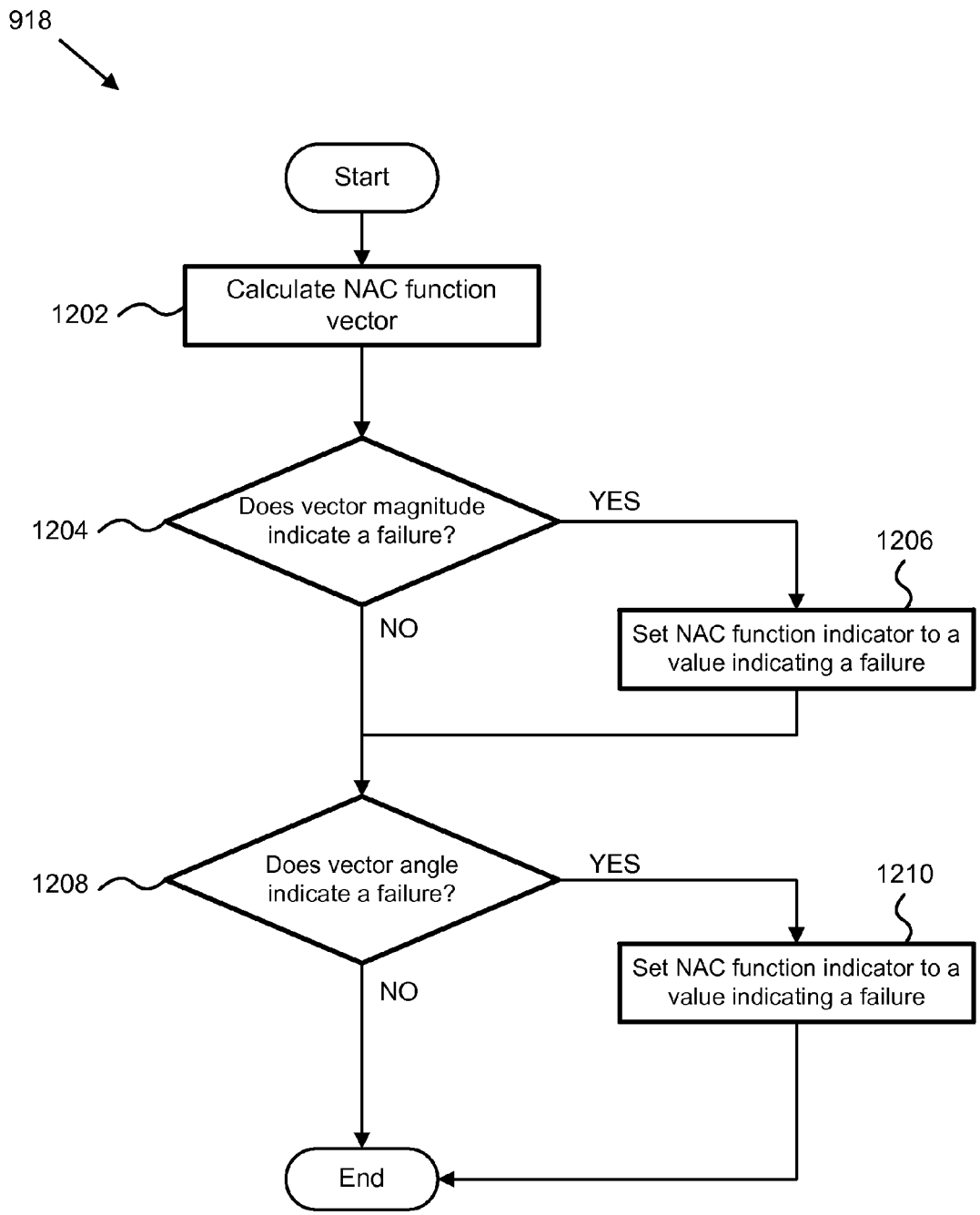
FIG. 12 is a schematic flow chart diagram illustrating one embodiment of setting a NAC function indicator in accordance with the present invention.

FIG. 12 is a schematic flow chart diagram illustrating one embodiment of setting 918 a NAC function indicator in accordance with the present invention. The NAC function label module 210 may calculate 1202 a NAC function vector 246 from the lean-to-rich transition area 234 and the rich-to-lean transition area 236. The NAC function label module 210 may determine the NAC function indicator 244 from the angle and magnitude of the NAC function vector 246 by checking 1204 whether the vector magnitude indicates a failure, and checking 1208 whether the vector angle indicates a failure. The NAC function label module 210 may set 1206, 1210 the NAC function indicator 244 to a value indicating a failure according to the checks 1204, 1208.

Figure 13:
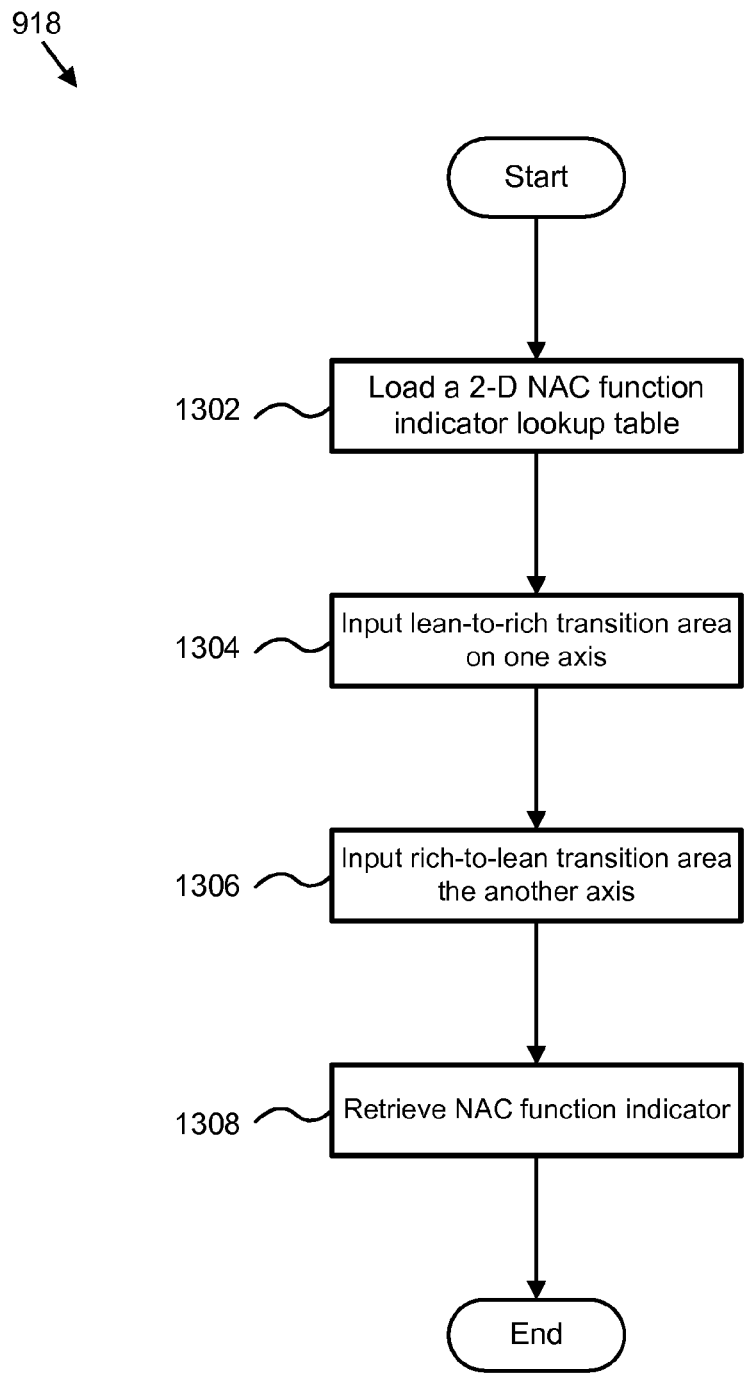
FIG. 13 is a schematic flow chart diagram illustrating an alternate embodiment of setting a NAC function indicator in accordance with the present invention.

FIG. 13 is a schematic flow chart diagram illustrating an alternate embodiment of setting 918 a NAC function indicator in accordance with the present invention. The NAC function label module 210 may set the NAC function indicator 244 according to the lean-to-rich transition area 234 and the rich-to-lean transition area 236 by retrieving the NAC function indicator 244 from a lookup table 300. The NAC function label module 210 may load 1302 a 2-dimensional function indicator lookup table 200, input 1304 the lean-to-rich transition area 234 into one axis 302 of the table 300, and input 1306 the rich-to-lean transition area 236 into another axis 304 of the table 300. The NAC function label module 210 may retrieve 1308 the NAC function indicator 244 from the table according to the inputs 1304, 1306.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for real-time diagnosis of a $NO_x$-adsorbing catalyst, the apparatus comprising:
   a $NO_x$-adsorption catalyst (NAC) operation module configured to verify that a NAC temperature exceeds a threshold, and to determine that the NAC is in a steady-state operating condition based on the number of at least one of successful and failed regeneration events performed on the NAC;
   an exhaust conditions module configured to survey a first oxygen sensor upstream of the NAC and a second oxygen sensor downstream of the NAC, and to calculate a lambda (λ) difference between the first and second oxygen sensors;
   an engine conditions module configured to interpret a NAC regeneration indicator;
   an integration module configured to determine a lean-to-rich transition area based on the λ difference and the regeneration indicator, and to determine a rich-to-lean transition area based on the λ difference and the regeneration indicator;
   a NAC function label module configured to set a NAC function indicator according to the lean-to-rich transition area and the rich-to-lean transition area; wherein the NAC operation module, exhaust conditions module, engine conditions module, integration module, and NAC function label module comprise one or more of logic hardware and executable code, the executable code stored on one or more non-transitory machine-readable storage media.

2. The apparatus of claim 1, wherein the NAC operation module is further configured to increment a steady-state counter when a successful regeneration of the NAC occurs, decrement the steady-state counter when a failed regeneration of the NAC occurs, and to determine that the NAC is in a steady-state operating condition when the steady-state counter exceeds a NAC steady state threshold.

3. The apparatus of claim 2, wherein the NAC operation module is configured to increment the steady-state counter by one for each successful regeneration, to decrement the steady-state counter by one for each unsuccessful regeneration, and wherein the NAC steady state threshold is twenty-three.

4. The apparatus of claim 1, wherein the integration module is further configured to determine a λ difference response based on the λ difference, and to determine the lean-to-rich transition area by integrating a difference between the λ difference response and a baseline lean-to-rich response.

5. The apparatus of claim 4, wherein the integration module is further configured to determine the rich-to-lean transition area by integrating a difference between the λ difference response and a baseline rich-to-lean response.

6. A method for real-time diagnosis of a $NO_x$-adsorbing catalyst, the method comprising:
   verifying that a $NO_x$-adsorption catalyst (NAC) temperature exceeds a threshold;

determining that the NAC is in a steady-state operating condition;

surveying a first oxygen sensor upstream of the NAC and a second oxygen sensor downstream of the NAC;

calculating a lambda (λ) difference between the first and second oxygen sensors;

interpreting a NAC regeneration indicator;

determining a lean-to-rich transition area based on the λ difference and the regeneration indicator;

determining a rich-to-lean transition area based on the λ difference and the regeneration indicator;

setting a NAC function indicator according to the lean-to-rich transition area and the rich-to-lean transition area; and determining a λ difference response based on the λ difference, and wherein determining the lean-to-rich transition area based on the λ difference and the regeneration indicator comprises integrating a difference between the λ difference response and a baseline lean-to-rich response.

7. The method of claim 6, further comprising verifying that the first oxygen sensor does not have a fault indication, and that the second oxygen sensor does not have a fault indication.

8. The method of claim 6, wherein surveying the first oxygen sensor comprises reading the first oxygen sensor response, and filtering the first oxygen sensor response, and wherein surveying the second oxygen sensor comprises reading the second oxygen sensor response, and filtering the second oxygen sensor response.

9. The method of claim 6, wherein determining that the NAC is in a steady-state operating condition comprises incrementing a steady-state counter when a successful regeneration of the NAC occurs, decrementing the steady-state counter when a failed regeneration of the NAC occurs, and wherein the NAC is determined to be in a steady-state condition when the steady-state counter exceeds a NAC steady state threshold.

10. The method of claim 9, further comprising limiting the steady-state counter to between a minimum value and a maximum value, inclusive.

11. The method of claim 9, wherein incrementing a steady-state counter comprises incrementing the steady-state counter by one for each successful NAC regeneration, and wherein decrementing the steady-state counter comprises decrementing the steady-state counter by one for each unsuccessful NAC regeneration.

12. The method of claim 10, wherein the NAC steady state threshold comprises twenty-three, the maximum value comprises thirty, and the minimum value comprises zero.

13. The method of claim 6, wherein integrating a difference between the λ difference response and a baseline lean-to-rich response comprises beginning an integration when the regeneration indicator indicates a regeneration event, and the λ difference response indicates a rich NAC outlet relative to the baseline lean-to-rich response.

14. The method of claim 13, wherein integrating a difference between the λ difference response further comprises stopping the integration when the λ difference response indicates that a major lean-to-rich pulse is completed.

15. The method of claim 14, further comprising tracking a second integrated area wherein the λ difference response indicates a lean NAC outlet relative to the baseline lean-to-rich response, wherein the major lean-to-rich pulse is completed when the second integrated area exceeds a threshold.

16. The method of claim 13, wherein integrating a difference between the λ difference response further comprises stopping the integration when the λ difference response indicates a lean NAC outlet relative to the baseline lean-to-rich response.

17. The method of claim 6, wherein determining the rich-to-lean transition area based on the λ difference and the regeneration indicator comprises integrating a difference between the λ difference response and a baseline rich-to-lean response.

18. The method of claim 17, wherein integrating a difference between the λ difference response and a baseline rich-to-lean response comprises beginning an integration when the regeneration indicator indicates the end of a regeneration event, and the λ difference response indicates a lean NAC outlet relative to the baseline rich-to-lean response.

19. The method of claim 18, wherein integrating a difference between the λ difference response further comprises stopping the integration when the λ difference response indicates that a major rich-to-lean pulse is completed.

20. The method of claim 19, further comprising tracking a second integrated area wherein the λ difference response indicates a rich NAC outlet relative to the baseline rich-to-lean response, wherein the major rich-to-lean pulse is completed when the second integrated area exceeds a threshold.

21. The method of claim 17, wherein integrating a difference between the λ difference response further comprises stopping the integration when the λ difference response indicates a rich NAC outlet relative to the baseline rich-to-lean response.

22. The method of claim 6, wherein setting a NAC function indicator according to the lean-to-rich transition area and the rich-to-lean transition area comprises retrieving the NAC function indicator from a lookup table.

23. The method of claim 6, wherein setting a NAC function indicator according to the lean-to-rich transition area and the rich-to-lean transition area comprises calculating a NAC function vector from the lean-to-rich transition area and the rich-to-lean transition area, and determining the NAC function indicator from the angle and magnitude of the NAC function vector.

24. The method of claim 23, further comprising setting the NAC function indicator to a value indicating a failure when the magnitude of the NAC function vector is less than half the magnitude of a standard NAC function vector.

25. The method of claim 23, further comprising plotting the NAC function vector on an X-Y graph wherein the X axis indicates the rich-to-lean transition area, wherein the Y axis indicates the lean-to-rich transition area, the method further comprising setting the NAC function indicator to a value indicating a failure when the angle of the NAC function vector is not between about ninety degrees and about two hundred forty degrees.

26. An system for real-time diagnosis of a $NO_x$-adsorbing catalyst, the system comprising:

an internal combustion engine producing an exhaust stream;

a $NO_x$-adsorbing catalyst (NAC) disposed to treat the exhaust stream;

a first oxygen sensor upstream of the NAC, and a second oxygen sensor downstream of the NAC;

a controller comprising one or more of logic hardware and executable code, the executable code stored on one or more non-transitory machine-readable storage media, the controller further comprising:

a $NO_x$-adsorption catalyst (NAC) operation module configured to verify that a $NO_x$-adsorption catalyst (NAC) temperature exceeds a threshold, and to determine that the NAC is in a steady-state operating condition;

an exhaust conditions module configured to survey the first oxygen sensor and the second oxygen sensor, and to calculate a lambda ($\lambda$) difference between the first and second oxygen sensors;

an engine conditions module configured to interpret a NAC regeneration indicator;

an integration module configured to determine a lean-to-rich transition area based on the $\lambda$ difference and the regeneration indicator, and to determine a rich-to-lean transition area based on the $\lambda$ difference and the regeneration indicator;

a NAC function label module configured to calculate a NAC function vector from the lean-to-rich transition area and the rich-to-lean transition area, and to set a NAC function indicator from the angle and magnitude of the NAC function vector.

27. The system of claim 26, wherein the engine comprises a diesel engine.

* * * * *